United States Patent
Hebert et al.

(10) Patent No.: US 6,299,045 B1
(45) Date of Patent: Oct. 9, 2001

(54) GUIDE METHOD AND APPARATUS FOR USE IN AN INTERNAL DRUM IMAGING SYSTEM

(75) Inventors: Thomas K. Hebert, Groveland, MA (US); James Argiros, Exeter, NH (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/398,158

(22) Filed: Sep. 16, 1999

(51) Int. Cl.$^7$ .............................. G03B 1/56; G01D 15/26
(52) U.S. Cl. .................. 226/90; 355/47; 355/72; 346/136
(58) Field of Search .................. 226/89, 90, 180; 271/117, 273, 275, 277; 346/136, 138

(56) References Cited

U.S. PATENT DOCUMENTS

| | | | |
|---|---|---|---|
| 3,576,283 | * 4/1971 | MacDonald, Jr. | 226/90 |
| 3,958,250 | * 5/1976 | Rolon | 346/24 |
| 5,709,139 | * 1/1998 | Shimizu et al. | 364/138 X |
| 5,721,582 | * 2/1998 | Bridges | 347/262 |
| 5,734,408 | * 3/1998 | Rombult et al. | 346/138 X |
| 5,775,563 | * 7/1998 | Kojima | 226/90 X |
| 5,865,118 | * 2/1999 | Fromson et al. | 101/463.1 |
| 5,938,187 | * 8/1999 | Colan et al. | 271/5 |
| 6,042,101 | * 3/2000 | Menard et al. | 271/10.01 |
| 6,097,475 | * 8/2000 | Jakul et al. | 355/72 |

\* cited by examiner

Primary Examiner—Michael R. Mansen
(74) Attorney, Agent, or Firm—William E. Hilton; Robert A. Saboutin (57) ABSTRACT

A guide method and apparatus is provided for use in an imaging system in which media is moved through the system in a first direction. The guide apparatus includes a roller unit for contacting a surface of the media and maintains contact with the surface of the media as the media moves in the first direction, and a retraction unit for separating the roller unit from the media. In an embodiment, the guide apparatus includes a carriage that moves radially toward and away from an internal drum so that the leading portion of media may be held against the internal drum. In other embodiments the guide apparatus includes a carriage that moves along the inner surface of an internal drum together with the leading portion of media. The method guides media in an imaging system in which media having a curled leading edge is moved through the system in a first direction along an inner surface of a cylindrical drum. The method includes the steps of: radially outwardly moving a roller toward the inner surface of the cylindrical drum; contacting a surface of the media that is proximate to the curled leading edge, and maintaining contact with the surface of the media as the media moves in the first direction along the inner surface of the cylindrical drum while inhibiting movement of the media in a direction transverse to the first direction; and radially inwardly moving the roller away from the inner surface of the cylindrical drum.

15 Claims, 7 Drawing Sheets

GUIDE METHOD AND APPARATUS FOR USE IN AN INTERNAL DRUM IMAGING SYSTEM

BACKGROUND OF THE INVENTION

The invention relates to the field of imaging systems, and particularly relates to imaging systems in which a continuous web of media is fed through an imaging apparatus.

Imaging systems that feed recording media through an imaging apparatus may include a movable optical carriage that displaces a beam of light from an imaging source, such as a laser. The carriage moves in a direction transverse to the direction of movement of the web in a slow scan to expose a supply of recording media to the light beam. The carriage itself typically includes a beam deflector assembly such as a deflector mirror and a spin motor for rotating the deflector mirror. Such a carriage for use in an imaging system including an internal imaging drum for supporting the recording media, is disclosed for example in U.S. Pat. No. 5,598,739, the disclosure of which is hereby incorporated reference.

Figure 1:
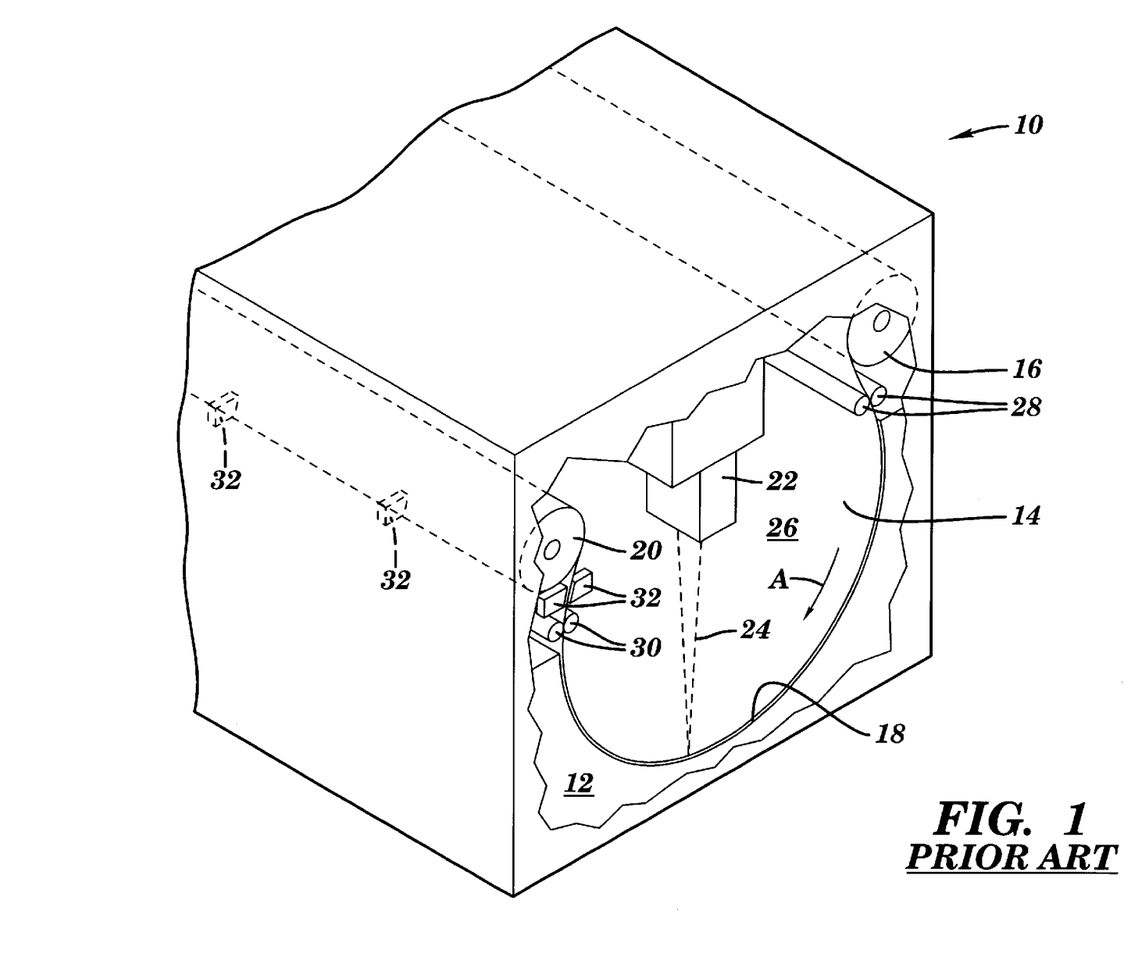
FIG. 1 shows an illustrative portion of an imaging system of the prior art.

As shown in FIG. 1, in a conventional imaging system 10 including an imaging drum 12, a web of image recording media 14 travels from a supply cassette roll 16 around the inner support surface 18 of the drum 12 to a take up cassette roll 20. The media generally has sufficient inherent stiffness that it maintains the cylindrical shape of the inner surface 18 of the drum 12 when coupled to cassette rolls 16 and 20. A movable carriage 22 may be used to position a beam of laser light 24 on desired portions of the recording surface 26 of the media 14. The imaging system 10 is typically coupled to a computer controlled image processor (not shown). Although it is important that as few components as possible contact the recording surface 26 of the media 14, the media 14 may be driven by nip rollers 28 and 30. The desired direction of movement of the web through the drum is shown generally at A.

The media 14 may also be indexed to register separate images by punching holes in the media at specific places such as by punches 32. The punch holes are later used to precisely register the media on printing equipment. Precise alignment of the media on printing equipment is critical for a number of reasons, including the fact that multiple passes may be undertaken to print a multi-color image of high resolution. The media, however, must be aligned on a printing device, such as a drum, either in the orientation dictated by the punch holes, or new punch holes must be created along at least one of the sides of the media. The process of providing the additional punch holes in recorded media requires additional steps that must be undertaken with care and precision, and introduces added costs and potential for error into the overall printing process.

It has been discovered that if punches such as those disclosed above are employed along a side edge of the web in the direction of travel of the web, then several problems persist that reduce the quality and/or consistency of recorded media. In particular, if the opening in such a punch is too large, then the media may jump (and possibly shift) as the punch element is removed from the media, and if the punch opening is too small, then the media may bind as it enters the punch (and even as it travels through the punch). Movement of even a small amount may cause misalignment due to the stringent alignment requirements of such imaging systems.

The use of punches having variable size openings that are adapted to provide a large size opening when the media is entering the punch and thereafter a smaller size opening, may overcome certain of the above difficulties. However, the use of a variable size opening punch also introduces the potential of alignment error as portions of the punch move relative one another. Again, movement of even a small amount may cause misalignment. Moreover, the use of punches having variable size openings increases mechanical complexities and risks damaging expensive recording media if mechanical failure occurs with respect to the punch.

There is a need, therefore, for an imaging system that permits alignment holes for aligning images to be provided along at least one side of recording media in the direction of travel of the web. There is further a need for such an imaging system that provides sufficient alignment quality and consistency.

SUMMARY OF THE INVENTION

The invention provides a guide method and apparatus for use in an imaging system in which media is moved through the system in a first direction. The guide apparatus includes a roller unit for contacting a surface of the media and maintaining contact with the media as the media moves in the first direction, and a retraction unit for separating the roller unit from the media. In an embodiment, the guide apparatus includes a carriage that moves radially toward and away from an internal drum so that the leading portion of media may be held against the internal drum. In other embodiments the guide apparatus includes a carriage that moves along the inner surface of an internal drum together with the leading portion of media.

The guide method guides media in an imaging system in which media having a curled leading edge is moved through the system in a first direction along an inner surface of a cylindrical drum. The method includes the steps of: radially outwardly moving a roller toward the inner surface of the cylindrical drum; contacting a surface of the media that is proximate to the curled leading edge, and maintaining contact with the surface of the media as the media moves in the first direction along the inner surface of the cylindrical drum while inhibiting movement of the media in a direction transverse to the first direction; and radially inwardly moving the roller away from the inner surface of the cylindrical drum.

BRIEF DESCRIPTION OF THE DRAWINGS

The following description may be further understood with reference to the accompanying drawings in which.

The drawings are shown for illustrative purposes only, and are not to scale.

DETAILED DESCRIPTION OF THE INVENTION

Figure 2:
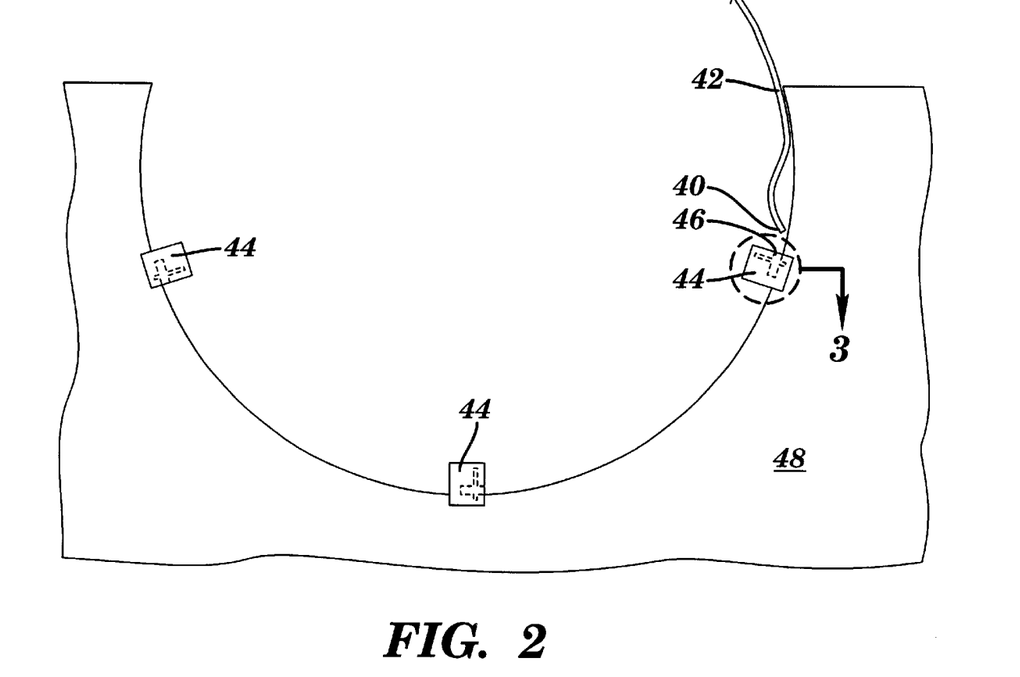
FIG. 2 shows an illustrative end view of a drum of an image setter including side punches in accordance with an embodiment of the invention.

It has been discovered that a significant amount of the difficulty experienced with side punches in imaging systems is related to the fact that the leading edge of recording media tends to curl slightly, even when freshly cut. As shown in FIG. 2, when the curled leading edge 40 of media 42 encounters the first of the side punches 44, the media 42 tends to bind at the side punch 44. The remaining portion of the media may continue to move relative to the portion of the media that is located at the punch opening 46. If side punches are used on one side only of the media, then any deflecting forces caused by the media contacting the punch 44 will be non-symmetrical, and more difficult for the media to overcome. The media at the edge adjacent the punch may be pushed toward the center and/or the web of media may move such that the leading edge of the media is no longer parallel with the rollers.

The media 42 will typically feed through the punch 44 when enough force has built up at the point of contact, but may suffer a small loss of alignment in the process. This small loss of alignment may lead to reduced image quality and consistency. The media may be fed through the apparatus using supply and take-up nip rollers as discussed above with reference to FIG. 1.

It has also been discovered that if a plurality of side punches are employed, then the first side punch encountered is responsible for most of the alignment errors. This is thought to be due to the fact that as the media 42 covers more of the cylindrical inner surface of the drum 48, it develops sufficient structural stiffness due to its cylindrical shape that more easily overcomes any reactive forces of the punches.

Figure 3:
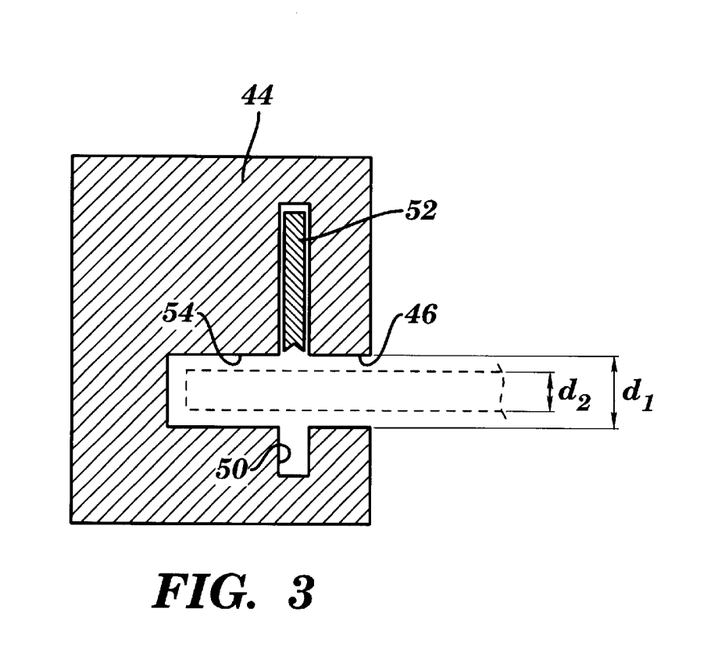
FIG. 3 shows an illustrative sectional view of a side punch shown in FIG. 2 taken along line 3—3 thereof.

As shown in FIG. 3, a punch 44 may include an opening of a fixed distance $d_1$, of for example about 0.04 inches, and the media 42 (shown in phantom in FIG. 3) may have a thickness $d_2$, of for example, about 0.004 inches to about 0.008 inches. The punch element 52 may be about 0.250 inches in diameter, and is designed to extend through the media and into a recess 50. When the punch element 52 is retracted, the media 42 is held against a stripper surface 54 while the punch element 52 is withdrawn from the media 42.

Figure 4:
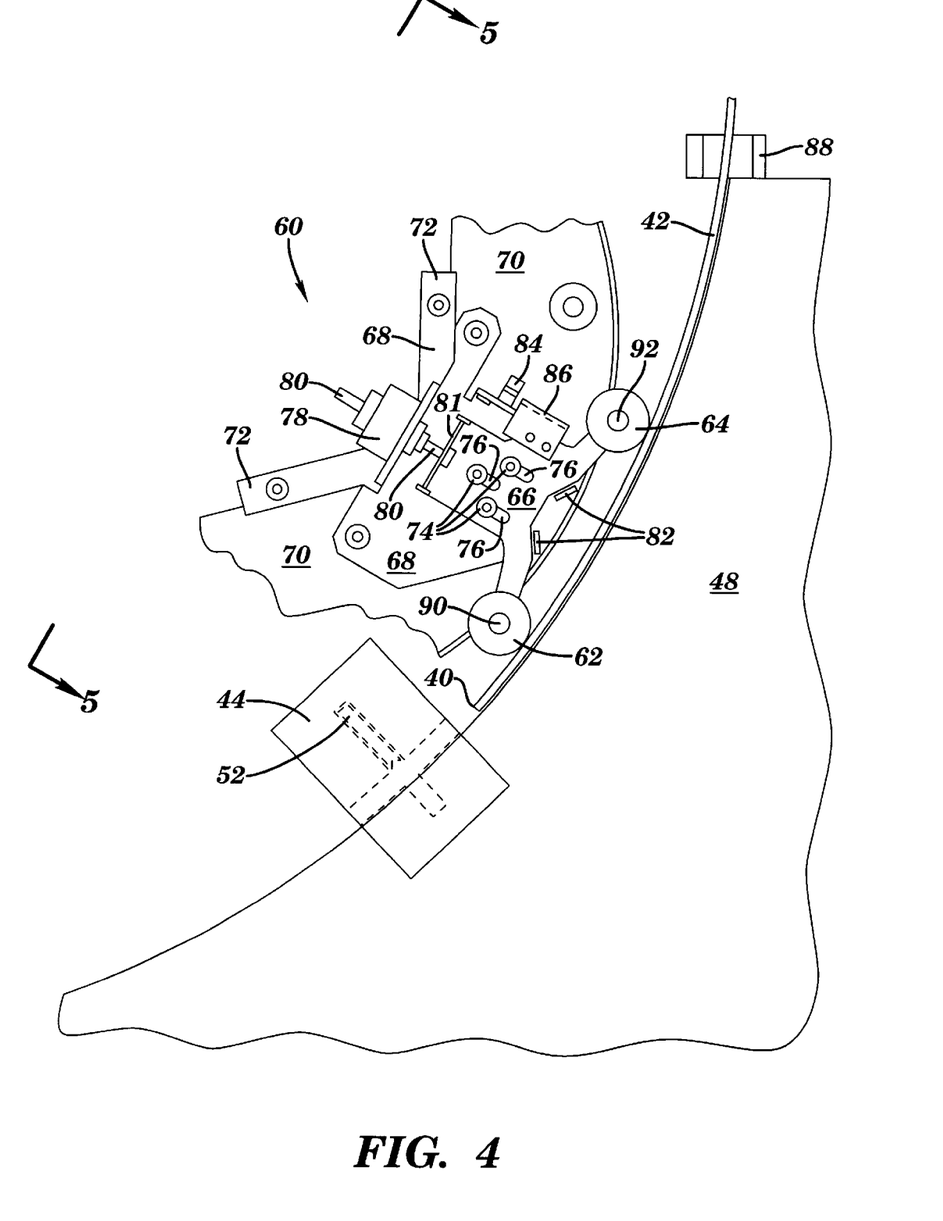
FIG. 4 shows an illustrative side view of a portion of an imaging system including a guide apparatus of an embodiment of the invention in the extended position.
Figure 5:
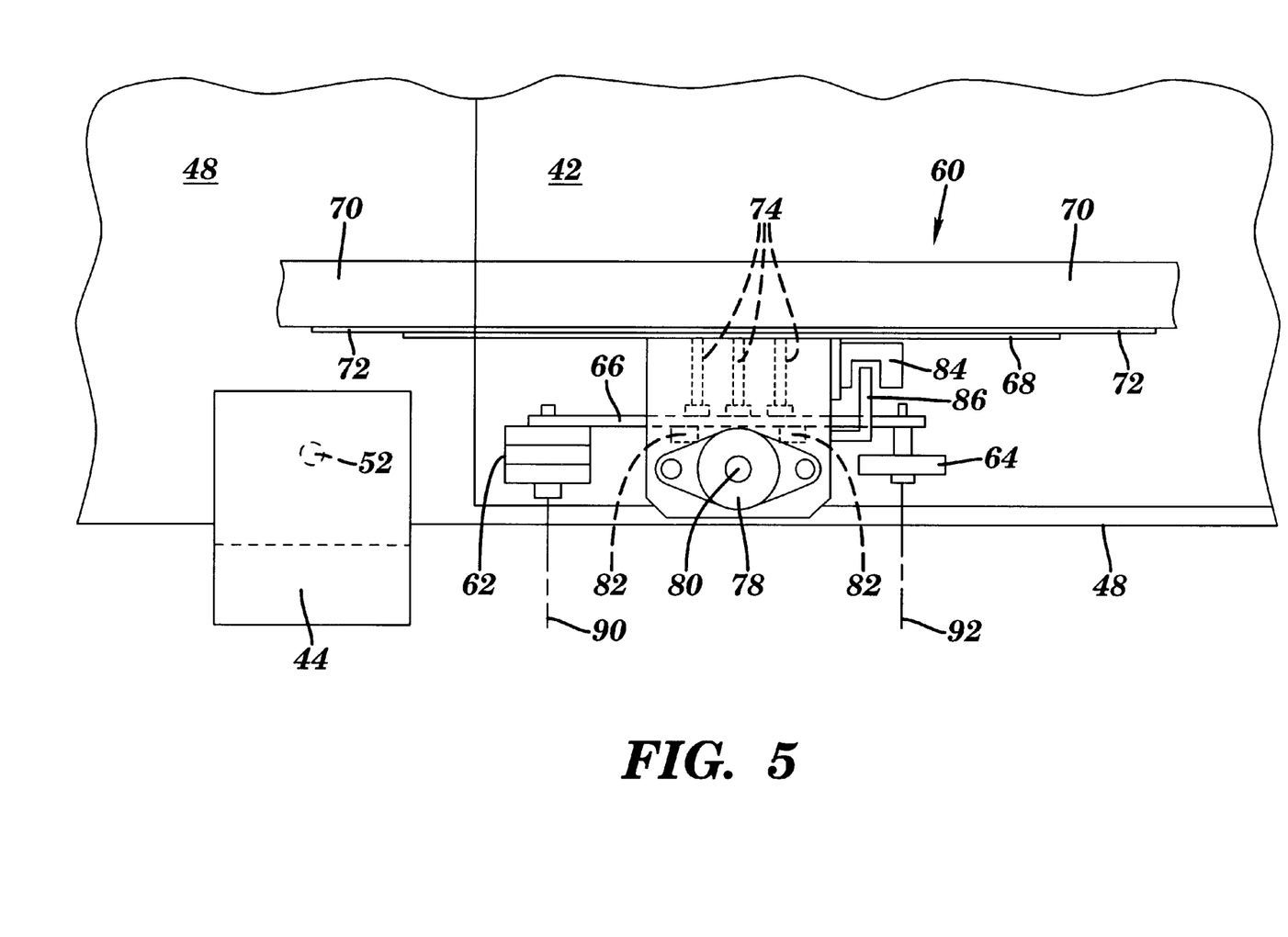
FIG. 5 shows an illustrative top view of the guide apparatus shown in FIG. 4 taken along line 5—5 thereof.

As shown in FIGS. 4 and 5, a guide apparatus 60 of an embodiment of the invention includes a pair of guide rollers 62 and 64 that are attached to a movable carriage 66. The guide rollers 62 and 64 may be formed of, or coated with, an elastomeric material that includes silicone. At least roller 62 preferably has a sufficient width (of for example about ½ inch), that it resists movement of the media in a direction transverse to the desired movement of the web through the drum. The movable carriage 66 is slidably mounted on a base plate 68, which in turn is fixed to support plate 70. Support plate 70 includes a stiffening member 72.

Figure 6:
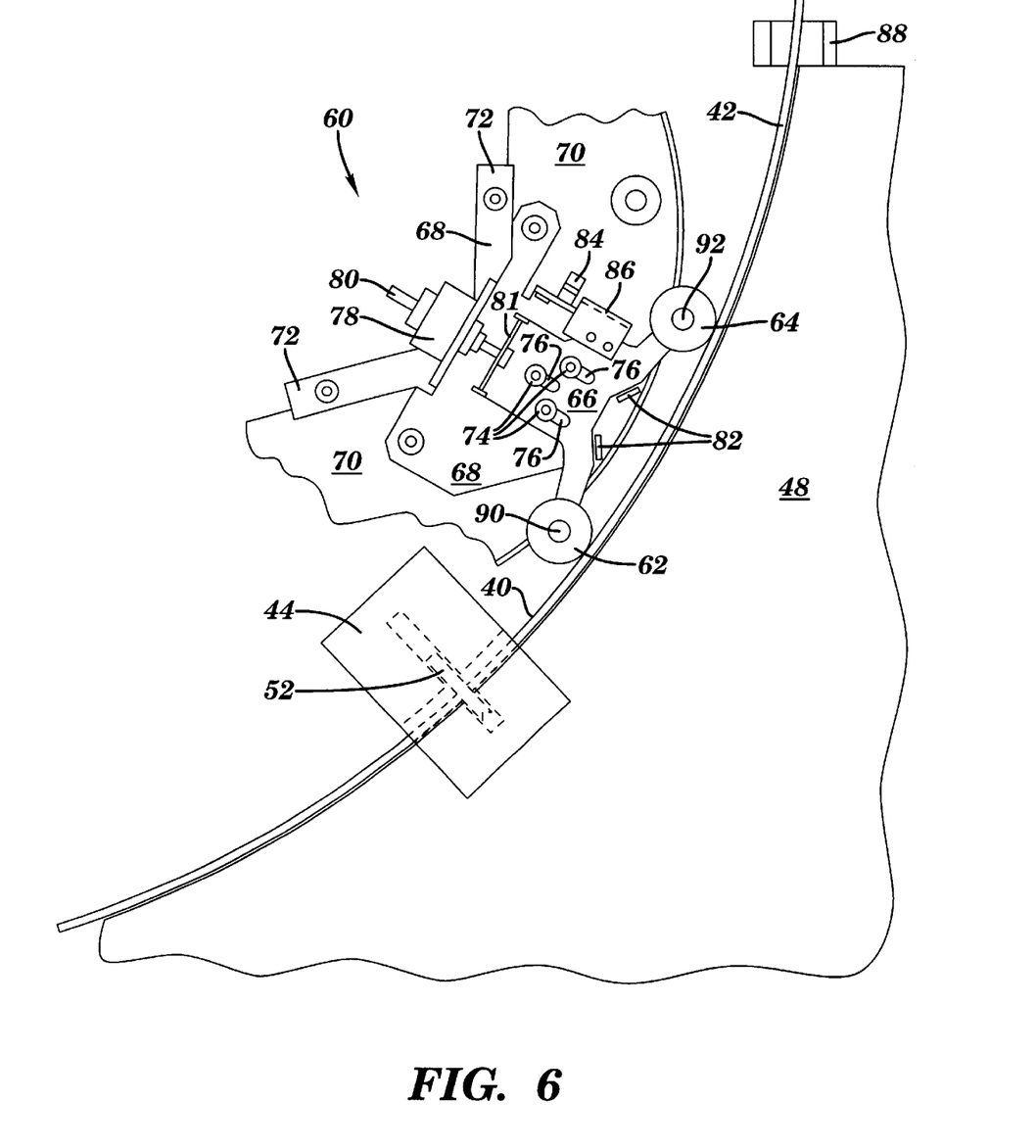
FIG. 6 shows an illustrative side view of the guide apparatus shown in FIG. 4 in the retracted position.

The carriage 66 is mounted on tile base plate 68 by providing that posts 74 on plate 68 fit into elongated slots 76 on the carriage 66. With further reference to FIG. 6, movement of the carriage 66 with respect to the plate 68 is controlled by a linear actuator motor 78, and the threaded axle 80 of the motor 78 is attached to a drive plate 81 on the carriage 66. The range of movement of the carriage 66 with respect to the base plate 68 is governed by stops 82 on the base plate 68 when actuated (as shown in FIG. 4), and by a home sensor 84 when retracted (as shown in FIG. 6). Specifically, the home sensor 84 is positioned on the base plate 68, and receives a home signal when a sensor plate 86 on the carriage 66 is positioned within the sensor's field.

During operation, and with reference initially to FIG. 4, when media passes by sensor 88, power is applied to the linear actuator motor 78 on the guide apparatus 60 to drive the carriage 66 toward the media 42. The carriage 66 moves until it abuts the stops 82 on the base plate 68. The carriage 66 is now actuated and when the media 42 encounters the rollers 62 and 64, the natural curl at the end 40 of the media 42 will flatten against the drum 48. The rollers 62 and 64 are free to roll with the media so as to minimally impact the photosensitive surface on the media. The rollers 62 and 64, which rotate about their respective axes generally indicated at 90 and 92, act to prevent movement of the web in the direction of the axes 90 and 92, i.e., in a direction transverse to the intended direction of movement of the web through the drum 48 (as shown at A in FIG. 1). The web 42 may now pass into and through the side punch 44 with minimal, if any, disturbances.

After the web 42 has passed through the punch 44, reverse power is applied to linear actuator motor 78 to retract the carraige 66 with respect to the base plate 68 until the sensor 84 indicates that the sensor plate 86 is within its sensor field. The application of reverse power to the linear actuator 78 is triggered by completion of the media load sequence. In further embodiments, the application of reverse power may be triggered by a timing delay based on the expected length of time needed for the media 42 to travel from the sensor 88 through the side punch 44. Due to the use of stops 82 the placement of the rollers 62 and 64 may be precisely controlled by design, while the home sensor 84 provides that the retraction position of the carriage need not be as precisely controlled. Further, the timing of the carriage movement need only be accurate enough that the wheels 62 and 64 contact the portion of the media 42 that is adjacent the leading edge 40. For these reasons, any increased mechanical complexity introduced by the use of such a guide apparatus is significantly minimized.

In an embodiment, one guide apparatus 60 may be employed at the input side of the first side punch 44. This may provide sufficient guiding of the media 42 that additional guide apparatus are not required for further side punches (if any). In other embodiments, guide apparatus such as apparatus 60 may be positioned adjacent the input side of any number of side punches 44 as discussed above. In further embodiments, guide apparatus such as apparatus 60 may further include any number of rollers such as rollers 62 and 64. For example one roller may be employed, or more than two rollers may be employed where the rollers are positioned to approximate the radius of the drum surface. After the media 42 is received by a take-up cassette roll in the imaging system, images may be recorded on the portion of media that is resident in the drum as known in the art. Thereafter, punch holes may be applied to the media by punch elements 52 in side punches 44.

Figure 7:
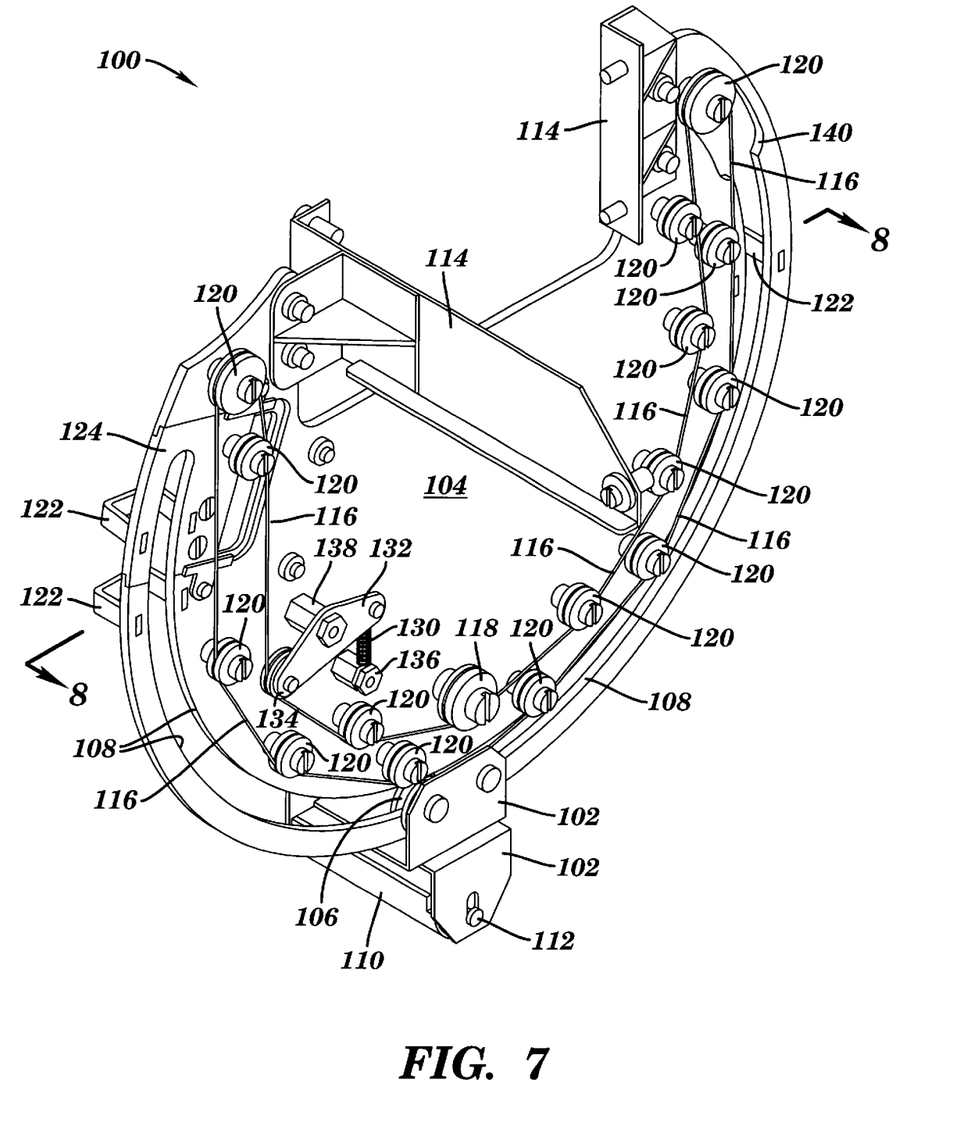
FIG. 7 shows an illustrative isometric view of a guide apparatus of another embodiment of the invention.
Figure 8:
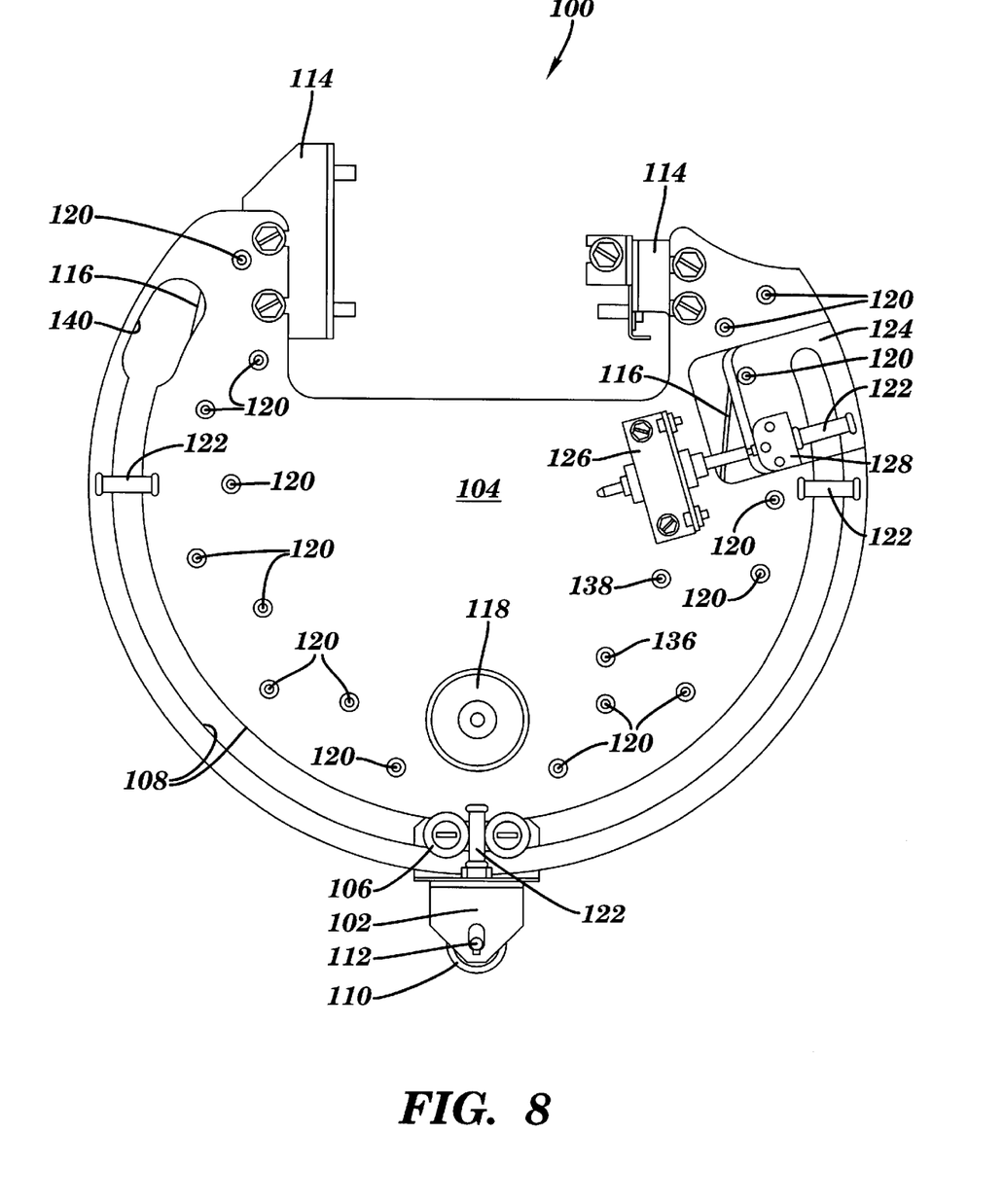
FIG. 8 shows an illustrative rear view of the guide apparatus of FIG. 7 taken along line 8—8 thereof.

As shown in FIGS. 7 and 8, in a further embodiment 100 of the invention, a movable carriage 102 is slidably attached to a base plate 104 via a pair of rollers 106 that travel within a arch shaped slot 108 in the base plate 104. The carriage 102 includes a single elongated roller 110 that has an outer surface formed of an elastomeric material that includes silicone. The roller 110 is free to rotate about its axis generally indicated at 112. The base plate 104 may be mounted to a portion of the inside of the image system, such as the optical carriage 22 and/or a side wall, by the support plates 114.

Movement of the carriage 102 around the slot 108 is controlled by a continuous cable 116 that is attached to the carriage 102 and driven by a drive motor 118. The cable is run around pulleys 120 as shown in FIG. 7, and braces 122 are positioned along the slot 108 to provide structural support for the portion of the base plate 104 that is radially outside the slot 108. The guide apparatus 100 also includes a retraction plate 124 that is coupled to the base plate (for example via guide notches) to permit the retraction plate 124 to move relative the base plate 104 upon actuation of the linear actuator 126. The linear actuator 126 is fixed to the base plate 104, and the threaded axis of the actuator is attached to a drive plate 128 on the retraction plate 124. A spring 130 is also employed together with a freely rotating bias plate 132 and pulley 134 to provide that the cable 116 is maintained in a state of tension, and to permit the cable 116 to move as the retraction plate 124 is retracted. The spring is fixed at one end at bolt 136, and the bias plate 132 is free to rotate with respect to post 138.

During operation, the carriage 102 is positioned in the start recess 140 of the slot 108. The slot recess permits the roller 110 to move slightly relative the base plate 104 as media is introduced between the roller 110 and a drum (not shown) as discussed above with reference to FIGS. 4–6. The carriage 102 is then driven by motor 118 and cable 116 to travel with the leading portion of the media as it rounds the inner surface of the drum, passing through each side punch. The roller 110 is preferably positioned between about ½ inch and about 3 inches from the inner sides of the punches such that the roller 110 does not contact the side punches, yet is sufficiently close that the media is appropriately guided through each punch. When the media and carriage 102 approach the take up cassette roll, the carriage 102 will enter the portion of the slot 108 that is provided by the retraction plate 124. When this occurs (as indicated by either a position sensor or timing), the linear actuator 126 drives the retraction plate 124 radially inward. This draws the roller 110 away from the media so that it will not further contact the media. When the retraction plate 124 is in the retracted position, the cable 116 will apply a force to the pulley 134 that causes the bias plate 132 to rotated such that the spring 130 is put into a state of further tension. After the media is exposed and removed from the system, the carriage 102 may be returned to the start recess 140.

Those skilled in the art will appreciate that numerous modifications and variations may be made to the above disclosed embodiments without departing from the spirit and scope of the present invention.

What is claimed is:

1. A guide apparatus for use in an internal drum imaging system in which media including a curled leading edge is moved through the system in a first direction, said guide apparatus comprising:
   one or more rollers that contact a surface of the media proximate the curled leading edge and maintains contact with the surface of the media as the media moves in the first direction while inhibiting movement of the media in a direction transverse to the first direction; and
   a retraction unit that separates said one or more rollers from the media.

2. The guide apparatus as claimed in claim 1, wherein said retraction unit includes a carriage coupled to said one or more rollers and wherein said carriage is adapted to move relative a base plate to provide retraction of the one or more rollers away from the media.

3. The guide apparatus as claimed in claim 1, wherein said guide apparatus further includes an actuator that moves said one or more rollers radially outwardly with respect to an internal drum of the imaging system.

4. The guide apparatus as claimed in claim 1, wherein said guide apparatus further includes a carriage that moves said one or more rollers along an inner surface of an internal drum of the imaging system.

5. The guide apparatus as claimed in claim 1, wherein said one or more rollers comprise a surface including an elastomeric silicone material.

6. A guide apparatus for use in an internal drum imaging system in which media including a curled leading edge is moved through the system in a first direction along an inner surface of a cylindrical drum, said guide apparatus comprising:
   one or more rollers that rotate about a roller axes;
   actuation means for radially outwardly moving said one or more rollers toward the inner surface of the cylindrical drum to permit said one or more rollers to contact a surface of the media proximate the curled leading edge and to maintain contact with the surface of the media as the media moves in the first direction along the inner surface of the cylindrical drum while inhibiting movement of the media in a direction transverse to the first direction; and
   retraction means for radially inwardly moving said one or more rollers away from the inner surface of the cylindrical drum.

7. The guide apparatus as claimed in claim 6, wherein said actuation means includes a carriage coupled to said one or more rollers, and wherein said carriage is adapted to move relative a base plate to provide actuation of the one or more rollers toward the cylindrical drum.

8. The guide apparatus as claimed in claim 7, wherein said actuation means further includes a linear actuator that provides movement of said carriage with respect to said base plate along an actuator direction that is transverse to the roller axes.

9. The guide apparatus as claimed in claim 6, wherein said retraction means includes a carriage coupled to said one or more rollers, and wherein said carriage is adapted to move relative a base plate to provide retraction of the one or more rollers away from the cylindrical drum.

10. The guide apparatus as claimed in claim 9, wherein said retraction means further includes a linear actuator that provides movement of said carriage with respect to said base plate along an actuator direction that is transverse to the roller axes.

11. The guide apparatus as claimed in claim 6, wherein said one or more rollers include a surface that comprises an elastomeric silicone material.

12. A method of guiding media in an internal drum imaging system in which media is moved through the system in a first direction along an inner surface of a cylindrical drum, said method comprising the steps of:
   radially outwardly moving at least one roller toward the inner surface of the cylindrical drum;
   contacting, with at least one roller, a surface of the media that is proximate to the curled leading edge, and maintaining contact with the surface of the media as the media moves in the first direction along the inner surface of the cylindrical drum while inhibiting movement of the media in a direction transverse to the first direction; and
   radially inwardly moving the at least one roller away from the inner surface of the cylindrical drum.

13. The method as claimed in claim 12, wherein said method further includes the step of moving said at least one roller along the inner surface of the cylindrical drum.

14. The method as claimed in claim 12, wherein said step of radially outwardly moving said at least one roller toward the inner surface of the cylindrical drum, includes the step of actuating a linear actuator.

15. The method as claimed in claim 12, wherein said step of radially inwardly moving said at least one roller away from the inner surface of the cylindrical drum, includes the step of monitoring a carriage position sensor.

* * * * *